(12) United States Patent
Coleman et al.

(10) Patent No.: US 8,177,018 B2
(45) Date of Patent: May 15, 2012

(54) ELECTRIC POWER STEERING SYSTEM OVER-SPEED ENERGIZING BRAKE SYSTEM

(75) Inventors: Brian C. Coleman, Shelby Township, MI (US); Christopher J. Mielke, Shelby Township, MI (US); George E. Doerr, Clarkson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 340 days.

(21) Appl. No.: 12/570,483

(22) Filed: Sep. 30, 2009

(65) Prior Publication Data

US 2011/0073404 A1 Mar. 31, 2011

(51) Int. Cl.
*F16D 59/02* (2006.01)
*B62D 5/04* (2006.01)

(52) U.S. Cl. .................. 180/444; 188/184; 192/105 CD

(58) Field of Classification Search .................. 180/444; 188/184, 185, 186; 192/105 CD, 103 A, 192/103 B
See application file for complete search history.

(56) References Cited

U.S. PATENT DOCUMENTS

| | | | | |
|---|---|---|---|---|
| 1,515,985 | A * | 11/1924 | Wright | 188/185 |
| 1,663,012 | A * | 3/1928 | Landry | 188/184 |
| 2,375,855 | A | 5/1945 | Lambert | |
| 2,387,039 | A | 10/1945 | Parrett | |
| 3,190,402 | A * | 6/1965 | Gubelmann | 188/185 |
| 3,552,904 | A * | 1/1971 | Lancey | 192/105 CD |
| 4,418,808 | A | 12/1983 | Nagai | |
| 4,428,450 | A | 1/1984 | Stenstrom et al. | |
| 4,588,060 | A * | 5/1986 | Norton | 192/43.2 |
| 4,625,849 | A * | 12/1986 | Gommel | 192/105 BA |
| 4,635,777 | A | 1/1987 | Nickel et al. | |
| 4,687,085 | A * | 8/1987 | Shimizu et al. | 192/104 C |
| 5,706,918 | A | 1/1998 | Redelman | |
| 6,125,976 | A | 10/2000 | Asai et al. | |
| 6,684,998 | B2 | 2/2004 | Nickel | |

* cited by examiner

*Primary Examiner* — Paul N Dickson
*Assistant Examiner* — Wesley Potter

(57) ABSTRACT

A bi-directional over-speed energizing brake system which implements automatically in the event an electric power steering system is in an over-speed condition. For rotational speeds of a rotating component exceeding a predetermined rotational speed threshold, centrifugal force acting on brake arms of a braking assembly overcome biasing by springs such that the brake arms will frictionally engage a non-rotating brake ring to thereby slow the rotational speed of the rotating component.

14 Claims, 5 Drawing Sheets

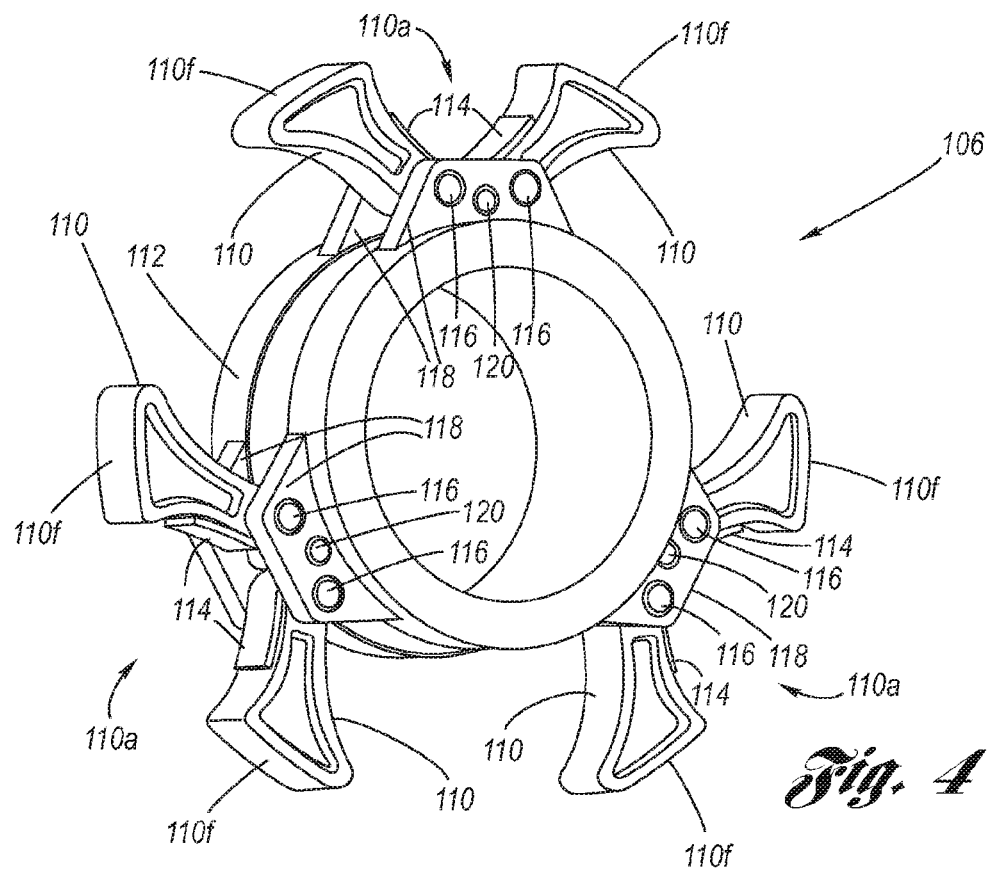
Fig. 4
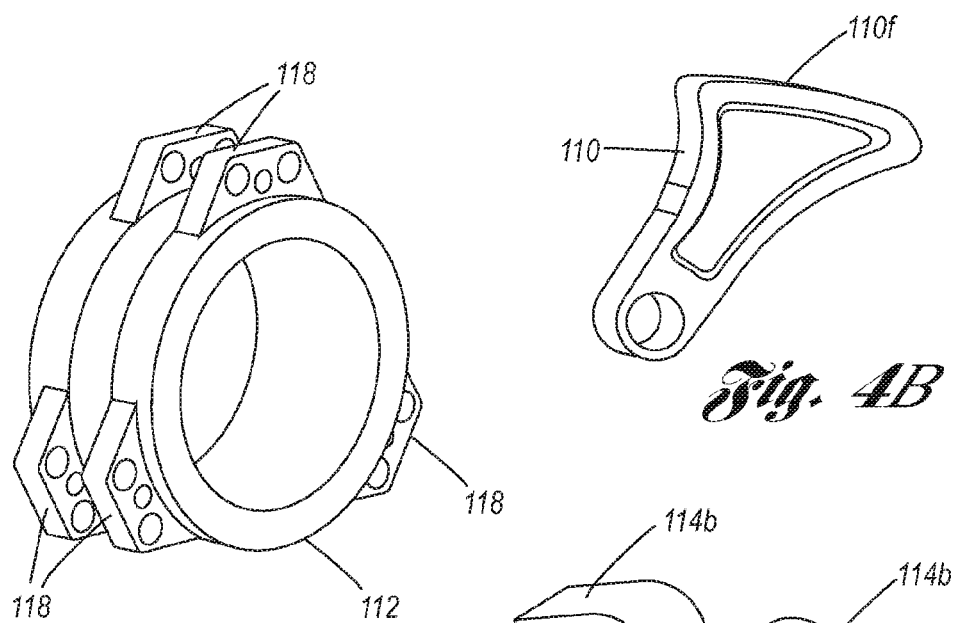
Fig. 4A
Fig. 4B
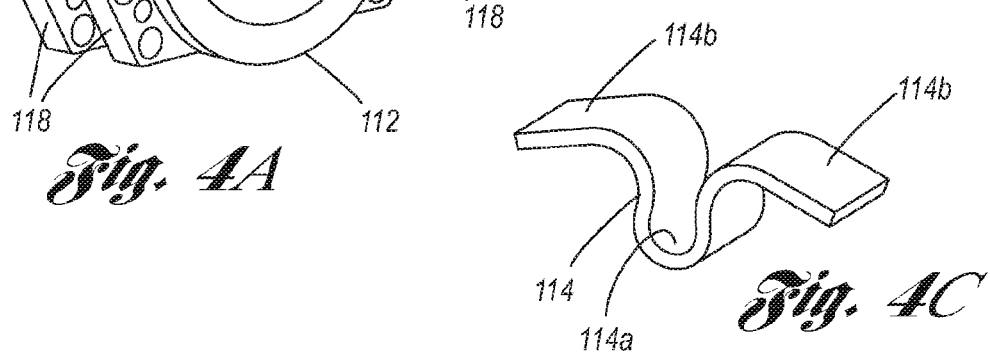
Fig. 4C

US 8,177,018 B2

ELECTRIC POWER STEERING SYSTEM OVER-SPEED ENERGIZING BRAKE SYSTEM

TECHNICAL FIELD

The present invention relates to motor vehicle electric power steering systems, and more particularly to a bi-directional automatic energizing brake system implemented when the power steering system is in an over-speed condition of operation.

BACKGROUND OF THE INVENTION

Electric power steering provides a steering assist to a motor vehicle driver as the driver turns the steering wheel in either direction of rotation. The electric motor of the electric power steering (EPS) system which serves to assist the steering by the driver can be connected to the rack of the steering system (an REPS system) or be connected to the steering column (a CEPS system), which are exemplified at FIGS. 1A and 1B.

FIG. 1A depicts an example of a CEPS system. A motor vehicle 40 is provided with a steering column electric power steering system 24 which may comprise a conventional rack and pinion steering mechanism 36, which includes a toothed rack (not shown) and a column pinion gear (not shown) of a gear box 52. As the steering wheel 26 is turned, an upper steering shaft 29 turns a lower steering shaft 51 through a universal joint 34; and the lower steering shaft 51 turns the column pinion gear. Rotation of the column pinion gear moves the rack, which moves tie rods 38 (only one shown), which move steering knuckles 39 (only one shown) to turn tires 42 (only one shown).

The electric power assist is provided through a controller 16 and a power assist actuator comprising an electric motor 46. The controller 16 receives electric power from a vehicle electric power source 10 through a line 12, a signal representative of the vehicle velocity on line 14 and column pinion gear angle from a column rotational position sensor 32 on line 20. As the steering wheel 26 is turned, a torque sensor 28 senses the torque applied to steering wheel 26 by the vehicle operator and provides an operator torque signal to controller 16 on line 18. In addition, as the rotor of the electric motor 46 turns, rotor position signals for each phase are generated within the electric motor and provided over bus 30 to the controller 16. In response to the vehicle velocity, operator torque, column pinion gear angle and rotor position signals received, the controller 16 derives desired electric motor phase currents and provides such currents through a bus 22 to the electric motor 46, which supplies torque assist to steering shaft 29 through worm gear 47 and motor pinion gear 48. Details hereof are described in U.S. Pat. No. 5,982,067. An example of an embodiment of the controller 16 is described in U.S. Pat. No. 5,668,722.

FIG. 1B depicts an example of an REPS system. The rack electric power steering system 60 comprises a conventional rack and pinion steering mechanism 62, which includes a toothed rack 64 which is connected to the tie rods (not shown) for directing the turning of the tires (not shown). The steering column has a lower assembly 66 having a column pinion gear 68 which is meshed with the teeth 70 of the toothed rack 64 so that turning of the steering column applies a torque at the toothed rack that results in the toothed rack translating left or right, depending on the direction of the turning of the steering column. The electric motor 72 of the electric power steering system is connected (by gearing, belt, etc.) to a ballscrew gear box 76. The electrical operation is as generally described with respect to FIG. 1A, as it is adapted to the configuration of FIG. 1B.

Under normal operating conditions, the electric power steering motor responsively assists the effort of the driver at the steering wheel to effect turning of the tires. However, an electric power steering system over-speed condition may arise, for example, if the motor vehicle is moving relative to an object and a tire is struck by the object, wherein the over-speed is the result of the motor vehicle speed relative to the struck object causing a rapid turning of the tire, and through the tie rods, back-driving the rotating components of the electric power steering system. In such a situation, the rotational speed of the electric power steering rotating components may become sufficiently excessive (an over-speed condition) that, at an abrupt end of travel event, possible damage to the components of the power steering system, such as for example the tie rod connections, the steering column, the I-shaft, the rack and pinion, etc., could occur, due to the large rotational inertia of the power steering rotating components that is present at the abrupt end of travel.

Therefore, what remains needed in the art is a mechanism that can prevent power steering system damage in the event of an over-speed condition of an electric power steering system.

With regard to braking devices, all drum/shoe brakes systems used on motor vehicles for most of the past 70/80 years use "energizing" principles. Also, energizing brakes of a disc nature are found on agricultural tractors from the 1940's through the 1980's which employ a ball ramp energizing mechanism.

An energizing brake uses the friction developed between the rotating surface and the braking surface to actually generate more force between the rotating surface and the braking surface. The energizing action continues in an upward amount until the friction coefficient begins to decrease (brake fade) or the rotating surface stops. Either way, the energy input from the rotating surface is gone, so the brake disengages. The actuation mechanism is one controlled by humans for the purpose of controlling a vehicle or machine, wherein at the onset of motor vehicles, there were no power boosted brakes from hydraulics or vacuum, as we have today. So, it was desired to acquire "brake boost" from the mass of the moving object by using energizing brakes, which delivered a much higher amount of brake torque than what was possible with human applied force only. For the energizing brake, the human applied enough force to engage the brake, but the energizing function is what did the majority of the work to stop the vehicle.

Accordingly, what remains needed in the art is a mechanism to use the energizing principle to keep the brake very small and light while achieving a high amount of torque to prevent the over speed situation and using centrifugal force to actuate the brake in the first place.

SUMMARY OF THE INVENTION

The present invention is a bi-directional over-speed energizing brake system which implements automatically in the event the power steering system is in an over-speed condition, whereby the rotational inertia of the power steering system is safely lowered before an end of travel event occurs.

The over-speed energizing brake system according to the present invention includes a brake ring connected to a non-rotating component of the power steering system and a braking apparatus connected to a rotating component of the power steering system and concentrically disposed relative to the brake ring. The braking apparatus includes a plurality of brake arms pivotally connected to a base which is connected to the rotating component, and biasing springs which bias the brake arms toward the base and disengaged with the brake ring.

In normal operation of the electric power steering system, the electric motor drives the power steering rotating components in response to driver torque commands through the steering column. This involves rotational speeds of the rotating components within a predetermined first rotational speed plateau. For rotational speeds exceeding a predetermined second rotational speed plateau which is, for example, generally well above the first rotational speed plateau, an abrupt end of travel event could cause damage due to excess rotational inertia of the rotating components. Accordingly, for a rotational speed threshold above the first rotational speed plateau and below the second rotational speed plateau, the centrifugal force acting on the brake arms will be sufficient to have overcome the biasing force of the biasing springs such that the arms will have engaged the brake ring, wherein the engagement is an energizing braking engagement that slows the rotational speed of the rotating components, whereupon should an end of travel event then occur, the electric power steering components will not be damaged.

Accordingly, it is an object of the present invention to provide a bi-directional over-speed energizing brake system which implements automatically in the event the power steering system is in an over-speed condition, whereby the rotational inertia of the power steering system is safely reduced before an end of travel event.

This and additional objects, features and advantages of the present invention will become clearer from the following specification of a preferred embodiment.

BRIEF DESCRIPTION OF THE DRAWINGS

FIG. 4 is a perspective view of the braking assembly of the over-speed energizing brake system according to the present invention, wherein the brake arms are shown in the engaged position.

FIG. 4A is a perspective view of the base of the braking assembly of FIG. 4.

FIG. 4B is a perspective view of a brake arm of the braking assembly of FIG. 4.

FIG. 4C is a perspective view of a biasing spring of the braking assembly of FIG. 4.

DESCRIPTION OF THE PREFERRED EMBODIMENT

Figure 1A:
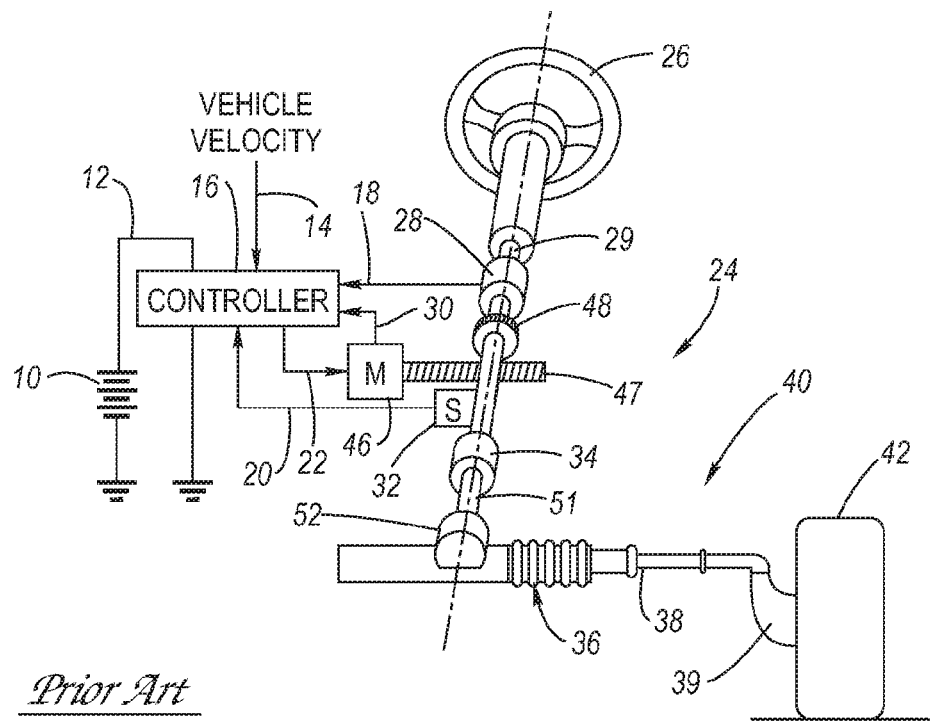
FIG. 1A is a schematic view of a prior art steering column electric power steering (CEPS) system.

Referring now to the Drawing, FIGS. 2A through 6 depict various examples of a bi-directional over-speed energizing brake system 100 for an electric power steering system.

Electric power steering systems (as for non-limiting example shown at FIGS. 1A and 1B), as opposed to hydraulic power steering systems, are vulnerable to high inertial momentum over-speed end of travel events (i.e., when an externally induced rapid turning of the tires (wheels) is abruptly halted, yet the power steering components are at that moment in high speed rotation). This is because the momentum contained in high speed rotational inertia, if speed is high enough and end of travel is abrupt, involves a large force impulse which could be damaging to power steering components.

Two rotational speed plateaus are of interest. A predetermined first rotational speed plateau is defined as the maximum operating rotational speed provided by the electric motor. At the first rotational speed plateau, an end of travel event involves rotational inertia that is easily absorbed without damage by the electric power steering components. By way of exemplification, the first rotational speed plateau (clockwise or counterclockwise) at the electric motor shaft may be about 5,000 revolutions per minute (rpm). A predetermined second rotational speed plateau, which is empirically determined or calculated by modeling, is a rotational speed above which an abrupt stop of rotation has associated with it enough momentum in the form of rotational inertia, that it could be possible for certain components of the electric power steering system to be damaged in an abrupt end of travel event. By way of exemplification, the second rotational speed plateau may be about 10,000 rpm at the electric motor shaft. This type of untoward event, known as "over-speed", is unlikely to ever happen, as such high momentum cannot be generated by the electric motor of the electric power steering system, and is, therefore, the result of an exceptional, externally driven event involving rotational speeds much higher than the first rotational speed plateau.

Accordingly, the over-speed energizing brake system 100 of the present invention is configured to only provide rotational braking in the event the electric power steering system is undergoing an untoward event in which the rotational speed is far higher than normal, and is entering into an over-speed condition, well above the first rotational speed plateau, but braked before attaining the second rotational speed plateau. The rotational speed at which the over-speed energizing brake system 100 causes braking is for rotational speeds exceeding a "rotational speed threshold", wherein the rotational speed threshold is selected as a rotational speed which is well above the first rotational speed plateau and below the second rotational speed plateau, preferably generally proximate to, but below, the second rotational speed plateau.

Figure 1B:
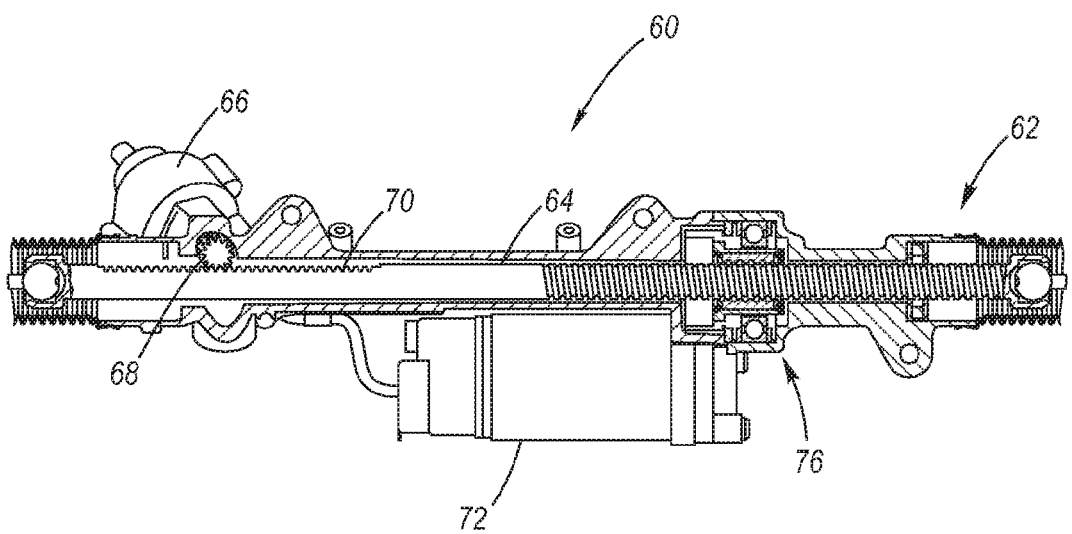
FIG. 1B is a schematic view of a prior art rack electric power steering (REPS) system.
Figure 2A:
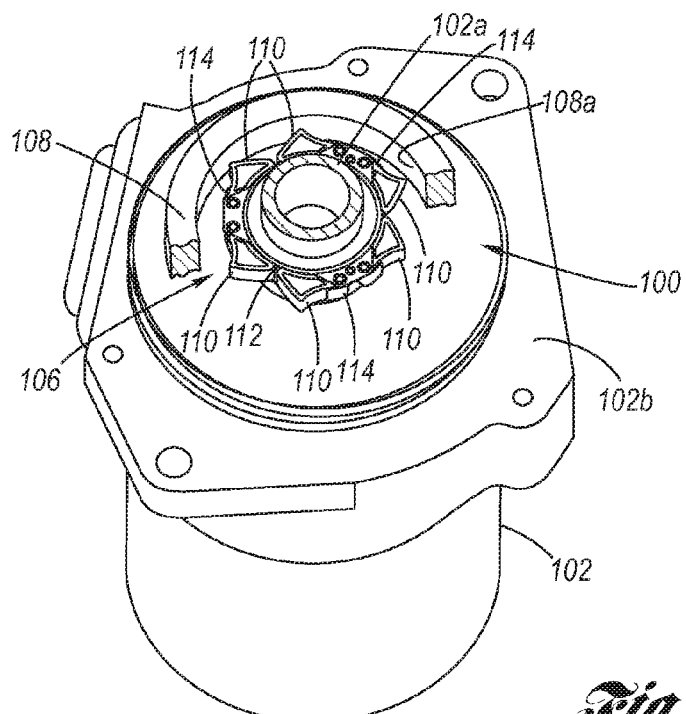
FIG. 2A is a partly sectional perspective view of an over-speed energizing brake system according to the present invention, seen mounted to an electric motor of an electric power steering system, wherein the brake arms are shown in a disengaged position.
Figure 2B:
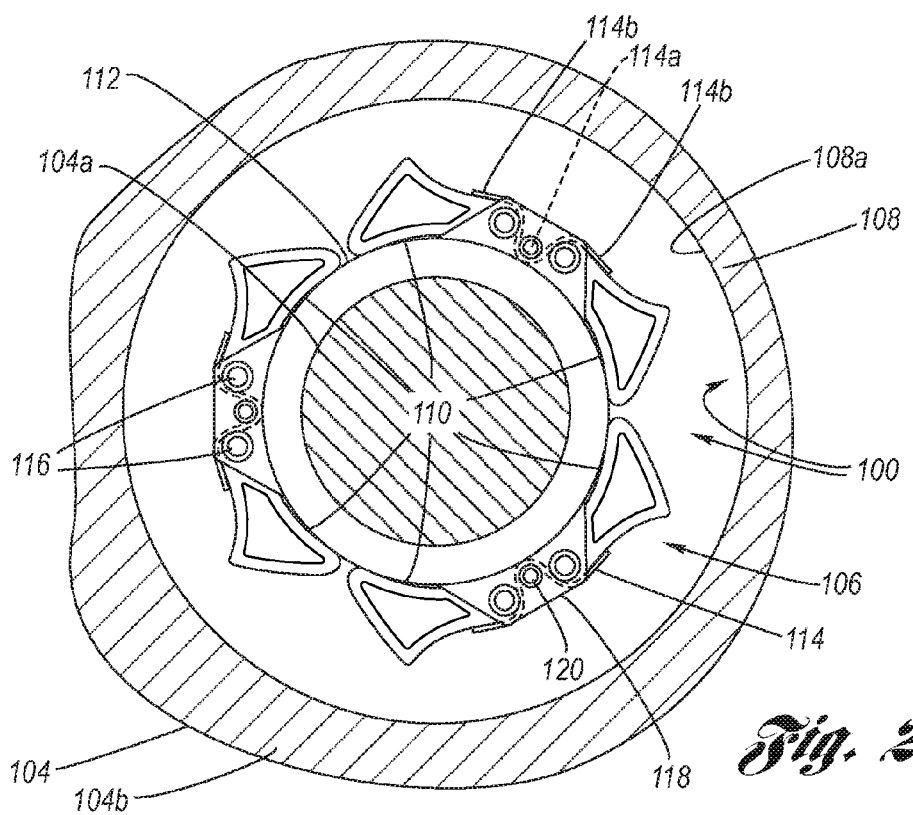
FIG. 2B is a partly sectional end view of an over-speed energizing brake system according to the present invention, seen mounted to a gear housing of an electric power steering system, wherein the brake arms are shown in the disengaged position.
Figure 3A:
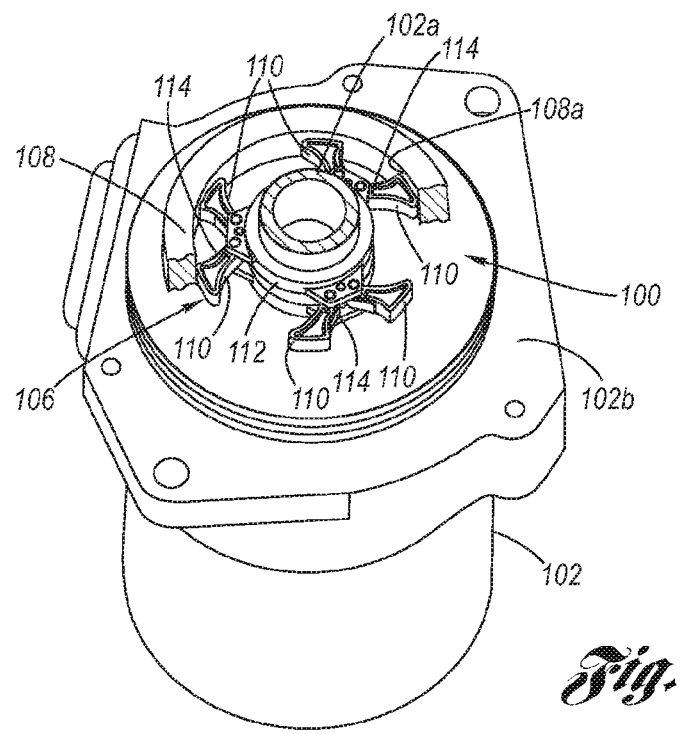
FIG. 3A is a partly sectional perspective view of an over-speed energizing brake system according to the present invention, seen mounted to an electric motor of an electric power steering system, wherein the brake arms are shown in an engaged position.
Figure 3B:
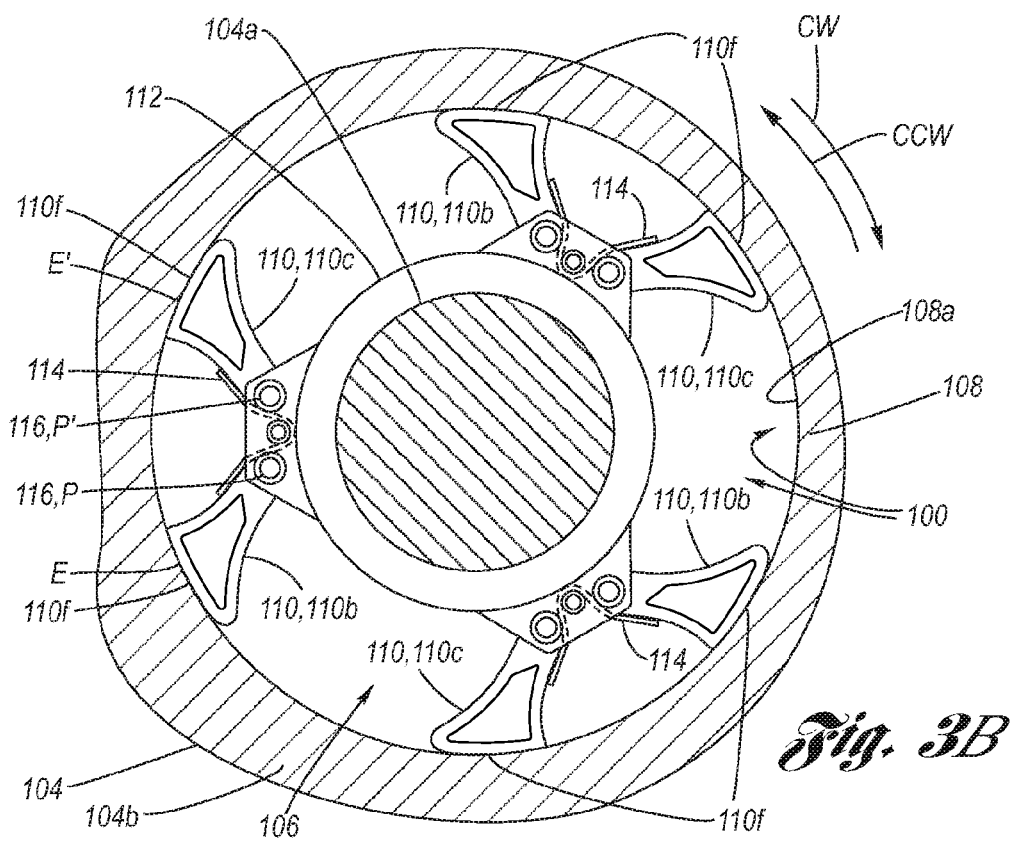
FIG. 3B is a partly sectional end view of an over-speed energizing brake system according to the present invention, seen mounted to a gear housing of an electric power steering system, wherein the brake arms are shown in the engaged position.

The over-speed energizing brake system 100 may be implemented at any suitable location of the electric power steering system whereat a rotating component is situate adjacent a non-rotating component, preferably at the electric motor 102, seen at FIGS. 2A and 3A (which can be implemented by way of example at electric motor 72 of FIG. 1A and electric motor 66 of FIG. 1B) or the gear box 104, seen at FIGS. 2B and 3B (which can be implemented by way of example at gear box 52 in FIG. 1A and gear box 76 of FIG. 1B).

The over-speed energizing brake system 100 is composed of a braking assembly 106 and an annular brake ring 108 having a braking surface 108a. The braking assembly 106 includes a plurality of brake arms 110, a base 112 and at least one biasing spring 114. The brake arms 110 are pivotally connected to a base 112, which is preferably annular. The base 112 is disposed concentrically with respect to the braking surface and is connected to a rotating component of the electric power steering system, as for example the shaft 102a of the electric motor 102, or a shaft 104a of the gear box 104. The brake arms 110 are configured with respect to a spacing L (see FIG. 5) between the respective pivot connection and the braking surface 108a such that the brake arms can pivot into engagement and disengagement with the braking surface. The at least one biasing spring 114 biases the brake arms toward the base and into a disengaged position with respect to the braking surface, as shown for example at FIGS. 2A and 2B. The brake ring 108 is connected to a non-rotating component of the power steering system, as for example the motor housing 102b of the electric motor 102 or the gear box housing 104b of the gear box 104.

It is preferred for the brake arms 110 to consist of brake arm pairs 110a, in which a first brake arm 110b is pivotally mounted to brake clockwise rotation, and the other brake arm 110c is pivotally mounted to brake counterclockwise rotation, to be explained in detail below. It is preferred for the brake arm pairs 110a to be mounted to the base 112 via an arm pin 116 passing through the brake arm and a clevis 118. A frictional material may optionally be located on either of the contact feet or the brake ring, although a metal-on-metal friction may be utilized. The brake arms 110 each have a contact foot 110f, whereby the contact feet provide braking contact with the brake surface 108a when the brake arms are at the engaged position, as shown at FIGS. 3A and 3B.

FIG. 3B shows how the brake arm pairs 110a provide bi-directional energizing braking.

Each first brake arm 110b has a pivot location P at its respective arm pin 116 which is disposed angularly lagging its engagement E with the braking surface 108a when the base has a counterclockwise rotation CCW at a speed exceeding the threshold rotation speed. Thus, in counterclockwise rotation CCW, each contact foot 110f of the first brake arms 110b would slide against the braking surface 108a in leading relation to the pivot location P at its respective arm pin 116, such that each first brake arm would be caused to press harder against the brake ring in the presence of any frictional force therebetween, which, in turn, tends to radially move the contact surface further outward from the base and pinchingly toward the braking surface, referred to herein as energizing braking. This energizing braking of the first brake arms 110b for counterclockwise rotation CCW is absent for the second brake arms 110c, in that the pivot location P' at their respective arm pins 116 is in leading relation to the sliding against the brake ring when the base has counterclockwise rotation, so there is no energizing braking in the sense there is no tendency to be moved radially further outward and pinch against the braking surface, except as is due to the centrifugal force exceeding the spring biasing force.

Each second brake arm 110c has a pivot location P' at its respective arm pin 116 which is disposed angularly lagging its engagement E' with the braking surface 108a when the base has a clockwise rotation CW at a speed exceeding the threshold rotation speed. Thus, in clockwise rotation CW, each contact foot 110f of the second brake arms 110c would slide against the braking surface 108a in leading relation to the pivot location P' of its respective arm pin 116, such that each second brake arm would be caused to press harder against the brake ring in the presence of any frictional force therebetween, which, in turn, tends to radially move the contact surface further outward from the base and pinchingly toward the braking surface, referred to herein as energizing braking. This energizing braking for clockwise rotation CW of the second brake arms 110c is absent for the first brake arms 110b, in that the pivot location P of their respective arm pins 116 is in leading relation to the sliding against the brake ring when the base has clockwise rotation, so there is no energizing braking in the sense there is no tendency to be moved radially further outward and pinch against the braking surface, except as is due to the centrifugal force exceeding the spring biasing force.

The brake arms 110 are biased toward the base and into the disengaged position. In this regard, it is preferred for a biasing spring 114 to be provided at each clevis 118 for each bi-directional brake arm pair 110a, wherein an apex 114a thereof passes around a spring pin 120, and the legs 114b of the biasing spring pass adjoining the arm pins 116 and along the brake arms so as to bias them toward the disengaged position, as for example shown at FIGS. 2A and 2B.

Figure 5:
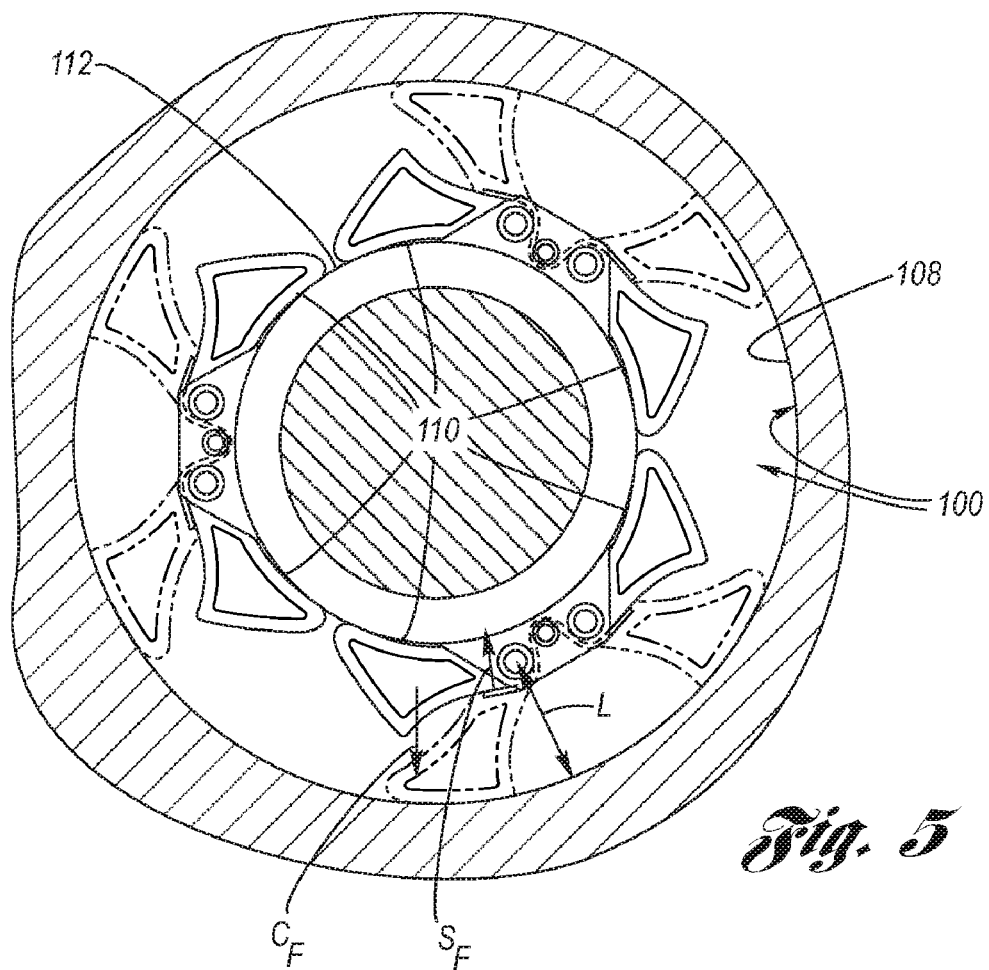
FIG. 5 is a partly sectional end view of the over-speed energizing brake system, as shown in FIGS. 2B and 3B, wherein operation is illustrated.
Figure 6:
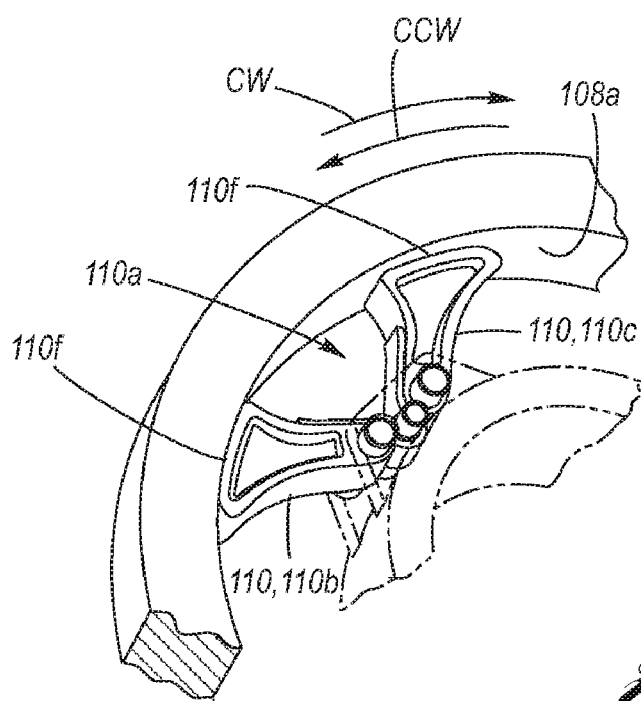
FIG. 6 is a partly sectional perspective view of the over-speed energizing brake system according to the present invention, wherein braking is illustrated.

Referring now additionally to FIGS. 5 and 6, operation of the present invention will be described.

Normal operation of the electric power steering system has the electric motor driving the power steering rotating components in response to driver torque commands through the steering column, involving rotational speeds not exceeding the first rotational speed plateau, wherein the brake arms 110 are disengaged from the braking surfaces, preferably the disengaged position shown in solid lines at FIG. 5, but in any event at any disengaged position with respect to the braking surface 108a. For rotation speeds approaching an over-speed condition, in which the rotating component to which the base is connected is rotating at a rotation speed exceeding the rotation speed threshold, then the centrifugal force $C_F$ acting on the brake arms 110 will be such that the centrifugal force will have overcome the biasing force $S_F$ of the biasing springs and the contact feet 110a of the brake arms 110 will have engaged the braking surface 108a, wherein the brake arms are at the engaged position, shown in phantom in FIG. 5. The engagement of the contact feet with the braking surface is an energizing braking engagement which slows rotation of the base 112, and, therefore, the rotating components of the electric power steering system, in that all the rotating components are mechanically connected to each other. Accordingly, the rotational speed of the rotating components will be reduced at least to no more than the rotational speed threshold, which is below the second rotational speed plateau, whereupon should an end of travel event then occur, the electric power steering components will not be damaged.

By way of non-limiting exemplification, the spring force $S_F$, where $S_F = -kx$, and the centrifugal force $C_F$, where $C_F = mv^2/r$, act in opposition to each other on the brake arms, where v is rotational velocity of the base, r is radial distance from the center of rotation to the center of mass m of the brake arms, k is the spring constant of the biasing springs and x is the distance of movement of the brake arms from a neutral position of the biasing spring arm. Thus, an example of operation may be as follows. The spring constant k, the mass, m, the configuration of the brake arms and the distance L between the pivot connections of the brake arms and the braking surface 108*a* is selected such that for v not exceeding the first rotational speed plateau, the contact feet of the brake arms are adjacent the base, in that $S_P > C_F$. However, as rotational speed increases above the first rotational speed plateau, then $S_P < C_F$, and the brake arms move toward the engaged position. For rotational speeds exceeding the rotational speed threshold, the centrifugal force becomes much larger so that the brake arms move further outward overcoming the biasing spring force such that the feet engage the braking surface, whereupon braking is applied to the rotating components of the electric power steering system, and the rotation thereof is kept below the second rotational speed plateau.

It should be kept in mind that the disengaged position of the brake arms is any position whereat engagement by the contact feet with the braking surface is absent.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An over-speed energizing brake system for an electric power steering system, said power steering system having rotatable components and non-rotatable components with respect to the motor vehicle, said over-speed energizing brake system comprising:
   a brake ring having an annular braking surface; and
   a braking assembly disposed in concentric relation to said braking surface, said braking assembly selectively engaging said braking surface in response to rotation of said braking assembly with respect to said brake ring, wherein for rotation speeds of said braking assembly not exceeding a predetermined rotation speed threshold then said braking assembly does not engage said braking surface, and wherein for rotation speeds of said braking assembly exceeding the predetermined rotation speed threshold then said braking assembly engages said braking surface, wherein the engagement is an energizing braking engagement which acts to slow the rotational speed of said braking assembly;
   wherein said brake ring is adapted for connection to a non-rotatable component of the electric power steering system;
   wherein said braking assembly is adapted for connection to a rotatable component of the electric power steering system; and
   wherein said braking assembly comprises:
      a base;
      a plurality of brake arms pivotally connected to said base;
      at least one biasing spring biasing said plurality of brake arms toward said base;
      wherein said base is adapted for connection to the rotatable component of the electric power steering system;
      wherein for rotation speeds of said base not exceeding the predetermined rotation speed threshold then said brake arms do not engage said braking surface, and wherein for rotation speeds of said base exceeding the predetermined rotation speed threshold then said brake arms engage said braking surface, wherein the engagement is an energizing braking engagement which acts to slow the rotational speed of said braking assembly;
      wherein said plurality of brake arms comprises:
         at least one pair of brake arms which provide bi-directional braking of said braking assembly with respect to said brake ring;
         wherein a first brake arm thereof has a pivot location which is disposed angularly lagging its engagement with said braking surface when said base rotates in a clockwise direction at a speed exceeding said threshold; and
         wherein a second brake arm thereof has a pivot location which is disposed angularly lagging its engagement with said braking surface when said base is rotating in a counterclockwise direction at a speed exceeding said threshold;
      wherein said at least one pair of brake arms comprises a plurality of pairs of brake arms which are mutually spaced apart on said base
      wherein said at least one biasing spring comprises a plurality of biasing springs retained by said base, one biasing spring, respectively, for each pair of brake arms;
      wherein each said brake arm has a contact foot structured for said engagement with said braking surface, each contact foot being disposed distally from the respective pivot connection of the respective brake arm to said base;
      wherein said base is annular and has a periphery; and
      said plurality of pairs of brake arms comprises three pairs of brake arms which are mutually spaced apart substantially equidistantly on the periphery of said base.

2. An electric power steering system of a motor vehicle, comprising:
   rotatable electric power steering components which are rotatable with respect to the motor vehicle;
   non-rotatable electric power steering components which are non-rotatable with respect to the motor vehicle; and
   an over-speed energizing brake system comprising:
      a brake ring having an annular braking surface; and
      a braking assembly disposed in concentric relation to said braking surface, said braking assembly selectively engaging said braking surface in response to rotation of said braking assembly with respect to said brake ring, wherein for rotation speeds of said braking assembly not exceeding a predetermined rotation speed threshold then said braking assembly does not engage said braking surface, and wherein for rotation speeds of said braking assembly exceeding the predetermined rotation speed threshold then said braking assembly engages said braking surface, wherein the engagement is an energizing braking engagement which acts to slow the rotational speed of said braking assembly;
   wherein said brake ring is connected to a selected non-rotatable component of the electric power steering system; and
   wherein said braking assembly is connected to a selected rotatable component of the electric power steering system.

3. The electric power steering system of claim 2, wherein said braking assembly comprises:
   a base;
   a plurality of brake arms pivotally connected to said base;
   at least one biasing spring biasing said plurality of brake arms toward said base;
   wherein said base is connected to the selected rotatable component of the electric power steering system; and wherein for rotation speeds of said base not exceeding the predetermined rotation speed threshold then said brake arms do not engage said braking surface, and wherein for rotation speeds of said base exceeding the predetermined rotation speed threshold then said brake arms engage said braking surface, wherein the engagement is an energizing braking engagement which acts to slow the rotational speed of said braking assembly.

4. The electric power steering system of claim 3, wherein said plurality of brake arms comprises:
   at least one pair of brake arms which provide bi-directional braking of said braking assembly with respect to said brake ring;
   wherein a first brake arm thereof has a pivot location which is disposed angularly lagging its engagement with said braking surface when said base rotates in a clockwise direction at a speed exceeding said threshold; and
   wherein a second brake arm thereof has a pivot location which is disposed angularly lagging its engagement with said braking surface when said base is rotating in a counterclockwise direction at a speed exceeding said threshold.

5. The electric power steering system of claim 4, wherein said at least one pair of brake arms comprises a plurality of pairs of brake arms which are mutually spaced apart on said base.

6. The electric power steering system of claim 5, wherein the electric power steering system further comprises an electric motor, wherein the non-rotating component is connected with a housing of said electric motor, and wherein the rotating component is connected with a shaft of said electric motor.

7. The electric power steering system 6, wherein said at least one biasing spring comprises a plurality of biasing springs retained by said base, one biasing spring, respectively, for each pair of brake arms.

8. The electric power steering system claim 7, wherein each said brake arm has a contact foot structured for said engagement with said braking surface, each contact foot being disposed distally from the respective pivot connection of the respective brake arm to said base.

9. The electric power steering system of claim 8, wherein:
   said base is annular and has a periphery; and
   said plurality of pairs of brake arms comprises three pairs of brake arms which are mutually spaced apart substantially equidistantly on the periphery of said base.

10. The electric power steering system of claim 5, wherein the electric power steering system further comprises a gear box and a rack, wherein the non-rotating component is connected with housing of said gear box, and wherein the rotating component is connected with said rack.

11. The electric power steering system 10, wherein said at least one biasing spring comprises a plurality of biasing springs retained by said base, one biasing spring, respectively, for each pair of brake arms.

12. The electric power steering system claim 11, wherein each said brake arm has a contact foot structured for said engagement with said braking surface, each contact foot being disposed distally from the respective pivot connection of the respective brake arm to said base.

13. The electric power steering system of claim 12, wherein:
   said base is annular and has a periphery; and
   said plurality of pairs of brake arms comprises three pairs of brake arms which are mutually spaced apart substantially equidistantly on the periphery of said base.

14. A method for selectively braking a rotating component of an electric power steering system, comprising the steps of:
   applying braking to a rotating component of the power steering system if the rotation speed of the rotating component exceeds a predetermined rotational speed threshold;
   wherein said step of applying is automatically responsive to centrifugal force of the rotating component.

* * * * *